US012679048B2

(12) United States Patent
Harada

(10) Patent No.: US 12,679,048 B2
(45) Date of Patent: Jul. 14, 2026

(54) FIBER STRUCTURE

(71) Applicant: KABUSHIKI KAISHA TOYOTA JIDOSHOKKI, Kariya (JP)

(72) Inventor: Ryo Harada, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 256 days.

(21) Appl. No.: 18/290,232

(22) PCT Filed: Mar. 9, 2022

(86) PCT No.: PCT/JP2022/010357
§ 371 (c)(1),
(2) Date: Nov. 10, 2023

(87) PCT Pub. No.: WO2022/254860
PCT Pub. Date: Dec. 8, 2022

(65) Prior Publication Data
US 2024/0239056 A1 Jul. 18, 2024

(30) Foreign Application Priority Data
Jun. 4, 2021 (JP) ................................. 2021-094652

(51) Int. Cl.
*B29C 70/22* (2006.01)
*B29C 70/34* (2006.01)
(Continued)

(52) U.S. Cl.
CPC .............. *B29C 70/22* (2013.01); *B29C 70/34* (2013.01); *D03D 1/00* (2013.01); *F17C 1/16* (2013.01);
(Continued)

(58) Field of Classification Search
None
See application file for complete search history.

(56) References Cited

U.S. PATENT DOCUMENTS 5,952,067 A 9/1999 Head
2009/0098284 A1 4/2009 Xie et al.
(Continued)

FOREIGN PATENT DOCUMENTS

DE 10 2016 007 464 A1 12/2016
EP 2 867 494 B1 9/2018
(Continued)

OTHER PUBLICATIONS

Extended European Search Report dated Sep. 2, 2024 in application No. 22815617.0.
(Continued)

*Primary Examiner* — Arti Singh-Pandey
(74) *Attorney, Agent, or Firm* — Sughrue Mion, PLLC

(57) ABSTRACT

A fiber structure includes a cylindrical body that has a plurality of fiber layers including: a first fiber layer including at least one of a first yarn and a second yarn; and a second fiber layer including the first yarn and the second yarn. The first yarn and the second yarn are formed of reinforced fibers. The first fiber layer does not include interlaced sections in which the second yarn is interlaced with the first yarn. One of the fiber layers that forms an inner surface of the cylindrical body serves as an innermost layer. Another one of the fiber layers that forms an outer surface of the cylindrical body serves as an outermost layer. At least one of the innermost layer and the outermost layer is formed of the second fiber layer, and the second fiber layer includes the interlaced sections.

4 Claims, 8 Drawing Sheets

(51) Int. Cl.

| | |
|---|---|
| *B29L 31/00* | (2006.01) |
| *D03D 1/00* | (2006.01) |
| *F17C 1/16* | (2006.01) |

(52) U.S. Cl.
CPC ... *B29L 2031/7156* (2013.01); *D10B 2505/02* (2013.01); *D10B 2505/10* (2013.01); *F17C 2201/0109* (2013.01); *F17C 2203/0604* (2013.01); *F17C 2203/0621* (2013.01); *F17C 2203/0673* (2013.01); *F17C 2221/033* (2013.01)

(56) References Cited

U.S. PATENT DOCUMENTS

| | | |
|---|---|---|
| 2015/0224737 A1 | 8/2015 | Kamiya |
| 2016/0101592 A1 | 4/2016 | Sauer et al. |
| 2020/0072415 A1 | 3/2020 | Kamiya et al. |

| | | | |
|---|---|---|---|
| 2021/0123168 A1 | | 4/2021 | Yoneshige et al. |
| 2021/0247025 A1* | | 8/2021 | Nouwen .................. F17C 1/16 |
| 2021/0310614 A1 | | 10/2021 | Kamiya |

FOREIGN PATENT DOCUMENTS

| | | | |
|---|---|---|---|
| JP | 2016-522305 A | 7/2016 | |
| JP | 2018-178289 A | 11/2018 | |
| JP | 2021-025164 A | 2/2021 | |
| WO | 2014/030631 A1 | 2/2014 | |
| WO | 2014/030633 A1 | 2/2014 | |
| WO | 2018193868 A1 | 10/2018 | |

OTHER PUBLICATIONS

Communication issued Nov. 19, 2024 in Japanese Application No. 2021-094652.
International Search Report for PCT/JP2022/010357 dated May 17, 2022.
Written Opinion for PCT/JP2022/010357 dated May 17, 2022.

* cited by examiner

FIBER STRUCTURE

CROSS REFERENCE TO RELATED APPLICATIONS

This application is a National Stage of International Application No. PCT/JP2022/010357 filed Mar. 9, 2022, claiming priority based on Japanese Patent Application No. 2021-094652 filed Jun. 4, 2021, the contents of all of which are incorporated herein by reference in their entirety.

TECHNICAL FIELD

The present disclosure relates to a fiber structure.

BACKGROUND ART

It is known that a fiber structure is impregnated with thermosetting resin by Resin Transfer Molding (RTM) to form a fiber-reinforced composite material, for example. The fiber structure includes a cylindrical body having a cylindrical shape, for example. The cylindrical body has a plurality of fiber layers laminated on top of each other in a laminating direction, for example. The fiber layers include a first yarn, and a second yarn that extends in a yarn main axis direction that is different from a yarn main axis direction of the first yarn, for example.

A fiber structure described in Patent Literature 1 has a structure, i.e., a non-crimp structure, in which the second yarn is not interlaced with the first yarn. The first yarn and the second yarn are formed of reinforced fibers. Fewer interlaced sections where the second yarn is interlaced with the first yarn decreases waviness of the second yarn with respect to the first yarn. Accordingly, fewer interlaced sections of the fiber structure increase the strength of the fiber-reinforced composite material formed of the fiber structure.

CITATION LIST

Patent Literature

Patent Literature 1: U.S. Pat. No. 5,952,067

SUMMARY OF THE INVENTION

Technical Problem

If the fiber structure including fewer interlaced sections is impregnated with resin by RTM, the reinforced fibers of the outermost layer of the fiber structure may be subjected to impregnation resistance and may therefore become wavy. This may decrease the pressure capacity and the fatigue strength of the fiber-reinforced composite material formed of the fiber structure.

Solution to Problem

A fiber structure for solving the aforementioned circumstance is a fiber structure impregnated with thermosetting resin by RTM to form a fiber-reinforced composite material, the fiber structure comprising: a cylindrical body having a cylindrical shape, wherein the cylindrical body has a plurality of fiber layers laminated on top of each other in a laminating direction, the plurality of fiber layers includes: a first fiber layer including at least one of a first yarn and a second yarn extending in a yarn main axis direction that is different from a yarn main axis direction of the first yarn; and a second fiber layer including the first yarn and the second yarn, the first yarn and the second yarn are formed of reinforced fibers, the first fiber layer does not include interlaced sections in which the second yarn is interlaced with the first yarn, one of the fiber layers that forms an inner surface of the cylindrical body serves as an innermost layer, and another one of the fiber layers that forms an outer surface of the cylindrical body serves as an outermost layer, and at least one of the innermost layer and the outermost layer is formed of the second fiber layer, and the second fiber layer includes the interlaced sections.

A fiber structure for solving the aforementioned circumstance is a fiber structure impregnated with thermosetting resin by RTM to form a fiber-reinforced composite material, the fiber structure comprising: a cylindrical body having a cylindrical shape, wherein the cylindrical body has a plurality of fiber layers laminated on top of each other in a laminating direction, the plurality of fiber layers includes: a first fiber layer including a first yarn and a second yarn extending in a yarn main axis direction that is different from a yarn main axis direction of the first yarn; and a second fiber layer including the first yarn and the second yarn, the first yarn and the second yarn are formed of reinforced fibers, the first fiber layer and the second fiber layer each include interlaced sections in which the second yarn is interlaced with the first yarn, at least one of the first fiber layer and the second fiber layer is formed of a fabric, one of the fiber layers that forms an inner surface of the cylindrical body serves as an innermost layer, and another one of the fiber layers that forms an outer surface of the cylindrical body serves as an outermost layer, and at least one of the innermost layer and the outermost layer is formed of the second fiber layer, and the number of the interlaced sections of the second fiber layer is more than the number of the interlaced sections of the first fiber layer.

When the resin impregnation is performed by RTM, the fiber layer as the innermost layer or the outermost layer is subjected to impregnation resistance of the thermosetting resin. According to the aforementioned configurations, at least one of the innermost layer and the outermost layer is formed of the second fiber layer. The second yarn is interlaced with the first yarn in the interlaced sections, and the number of the interlaced sections of second fiber layer is more than that of the first fiber layer. Accordingly, the reinforced fibers of the second fiber layer are unlikely to become wavy, which may be caused by the impregnation resistance of thermosetting resin. This suppresses a decrease in the pressure capacity and the fatigue strength of the fiber-reinforced composite material formed of the fiber structure.

According to the aforementioned configurations, the number of the interlaced sections of the first fiber layer is less than that of the second fiber layer. Accordingly, the second yarn of the first fiber layer is less likely to become wavy, which may be caused by interlacement of the second yarn with the first yarn, as compared with the second yarn of the second fiber layer. The multiple fiber layers include the first fiber layer, thereby increasing the strength of the fiber-reinforced composite material formed of the fiber structure. This increases the strength of the fiber-reinforced composite material without increasing the number or thickness of the first yarn and the second yarn of the fiber structure, thereby suppressing an increase in weight of the fiber-reinforced composite material. This therefore suppresses a decrease in the pressure capacity and the fatigue strength and an increase in weight of a fiber-reinforced composite material formed of a fiber structure, and increases the strength of the fiber-reinforced composite material.

In the fiber structure, the first fiber layer may include the first yarn, and the first yarn may continuously extend between the first fiber layer and the second fiber layer.

This configuration increases the strength of the fiber structure in the yarn main axis direction of the first yarns, as compared with a configuration in which the first yarn does not continuously extend between the first fiber layer and the second fiber layer. This further increases the strength of the fiber-reinforced composite material formed of the fiber structure.

Advantageous Effects of the Invention

The present disclosure is capable of suppressing a decrease in the pressure capacity and the fatigue strength of a fiber-reinforced composite material formed of a fiber structure and an increase in weight of the fiber-reinforced composite material, and increasing the strength of the fiber-reinforced composite material.

DESCRIPTION OF EMBODIMENTS

First Embodiment

The following will describe a fiber structure according to a first embodiment with reference to accompanying FIGS. 1 to 11. The following will describe an example of the fiber structure that is used for a pressure container. For the sake of explanation, the fiber structure will be explained after explanation of the pressure container. The figures show X-axis, Y-axis, and Z-axis that are perpendicular to each other. In the following description, a direction parallel to the X-axis is referred to as an axial direction X.

[Basic Configuration of Pressure Container]

Figure 1:
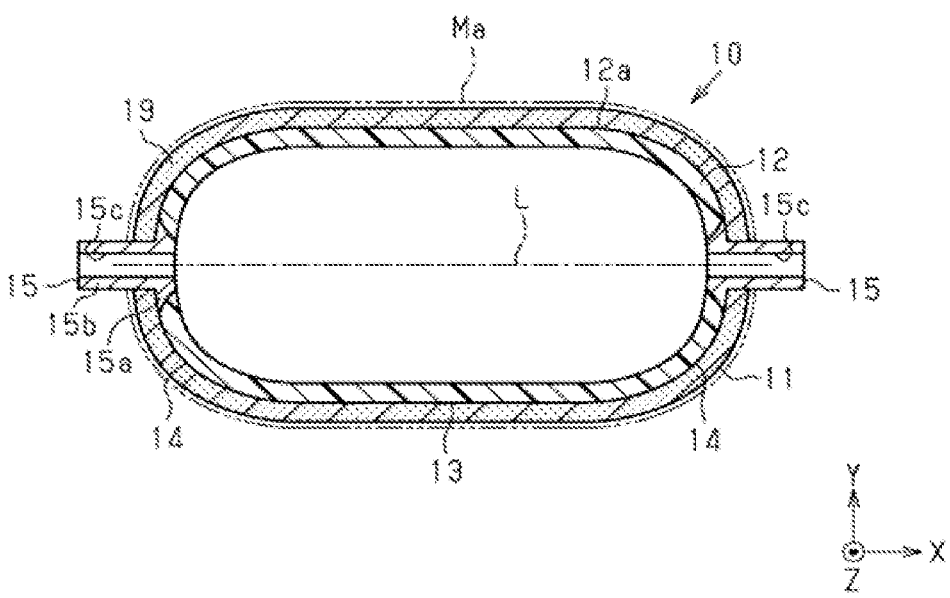
FIG. 1 is a schematic sectional view of a pressure container using a fiber structure according to a first embodiment.

As illustrated in FIG. 1, a pressure container 10 includes a fiber-reinforced composite material 11 and a liner 12. The pressure container 10 according to the present embodiment is a high-pressure tank for storing hydrogen gas. The liner 12 is made of a resin material, for example. The fiber-reinforced composite material 11 includes a fiber structure 19. The fiber structure 19 is impregnated with thermosetting resin as a resin matrix Ma. The fiber-reinforced composite material 11 is formed by impregnating the fiber structure 19 with thermosetting resin by RTM. Examples of thermosetting resin include epoxy resin, vinyl ester resin, unsaturated polyester resin, and phenolic resin. The liner 12 is reinforced by the fiber-reinforced composite material 11 to secure the pressure capacity of the pressure container 10.

[Basic Configuration of Pressure Container Precursor]

The following will the configuration of a pressure container precursor 10a of the pressure container 10.

Figure 2:
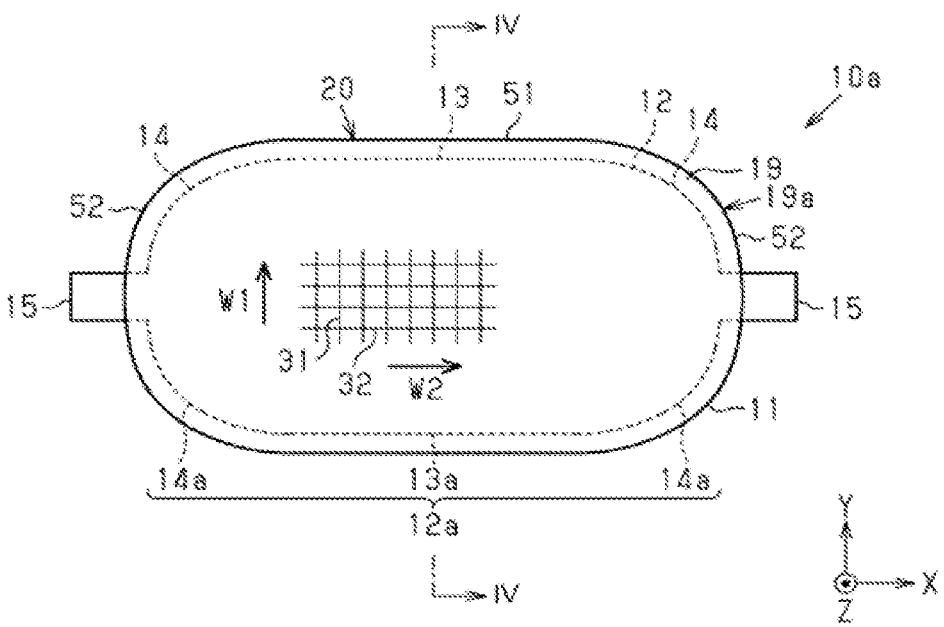
FIG. 2 is a schematic side view of a pressure container precursor according to the first embodiment.

As illustrated in FIG. 2, the pressure container precursor 10a includes the fiber structure 19 and the liner 12. The fiber structure 19 of the pressure container precursor 10a is a fiber preform 19a for manufacturing the pressure container 10 by impregnating the fiber structure 19 with thermosetting resin.

The pressure container precursor 10a is different from the pressure container 10 in that the pressure container precursor 10a does not include the fiber-reinforced composite material 11. Excluding this difference, the pressure container precursor 10a has the same configuration as that of the pressure container 10. The following will describe the configuration of the pressure container precursor 10a with reference to FIGS. 2 to 8, and the following explanation on the configuration of the pressure container precursor 10a is common to that of the pressure container 10 unless otherwise noted.

[Configuration of Liner]

Figure 3:
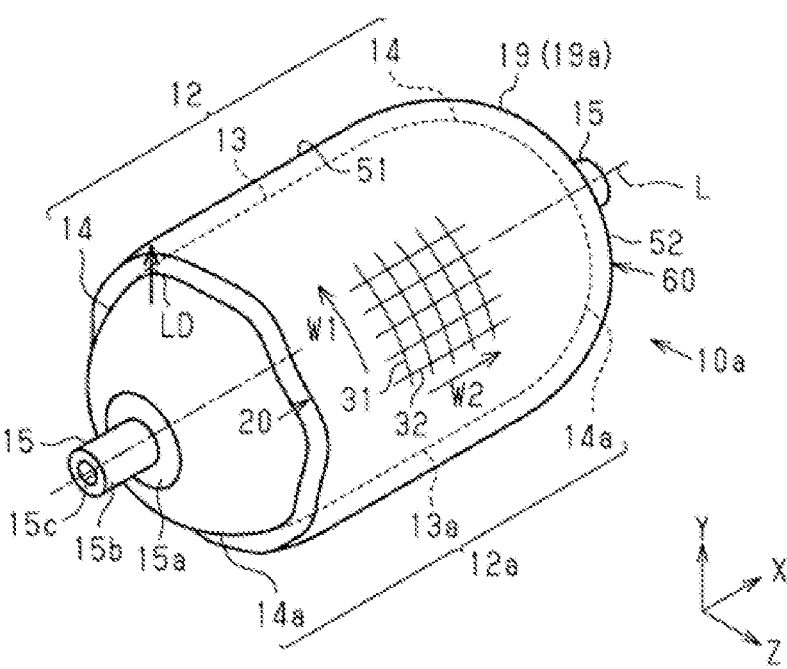
FIG. 3 is a perspective view of the pressure container precursor according to the first embodiment.

As illustrated in FIG. 3, the liner 12 includes a body 13 having a cylindrical shape and dome portions 14. In the present embodiment, the body 13 has a circular cylindrical shape. The central axis of the body 13 extends in the axial direction X. The central axis of the body 13 is simply referred to as a central axis L. The central axis L corresponds to the central axis of the liner 12. The body 13 has the dome portions 14 respectively at opposite ends of the body 13 in the axial direction X. The dome portions 14 have a shape that gradually shrinks toward the top of the dome portion 14. The body 13 and the dome portions 14 cooperate to define an inner space of the liner 12.

The fiber structure 19 covers a liner outer surface 12a that is the outer surface of the liner 12. The liner outer surface 12a includes a body outer surface 13a that is the outer surface of the body 13, and dome outer surfaces 14a that are the outer surfaces of the dome portions 14.

The liner 12 has caps 15 respectively at opposite ends of the liner 12 in the axial direction X. The caps 15 are made of a metallic material, for example. The caps 15 each include a connecting portion 15a connected to the dome portion 14, and a protruding portion 15b protruding from the connecting portion 15a.

The connecting portion 15a is disposed at the top of the dome portion 14. The protruding portion 15b passes through the fiber structure 19. The connecting portion 15a and the protruding portion 15b cooperate to have therein a cap hole 15c. The cap hole 15c is formed through the connecting portion 15a and the protruding portion 15b in the axial direction X. The inner space of the liner 12 is connected to the outside of the liner 12 through the cap hole 15c.

Although not illustrated, one of the cap holes 15c is closed by a valve attached to the corresponding one of the caps 15. The other of the cap holes 15c is closed by a screw installed in the other of the caps 15.

[Configuration of Fiber Structure]

As illustrated in FIGS. 2 and 3, the fiber structure 19 includes a cylindrical body 20 having a cylindrical shape. The central axis of the cylindrical body 20 extends in the axial direction X. The central axis of the cylindrical body corresponds to the central axis L. The cylindrical body 20 includes a plurality of fiber layers 51. The fiber layers 51 are laminated on top of each other in a laminating direction LD. In the present embodiment, the fiber layers 51 cover the body outer surface 13a. In the present embodiment, the fiber structure 19 includes dome fiber layers 52. The dome fiber layers 52 cover the dome outer surfaces 14a of the dome portions 14.

[Configuration of Fiber Layer]

Figure 4:
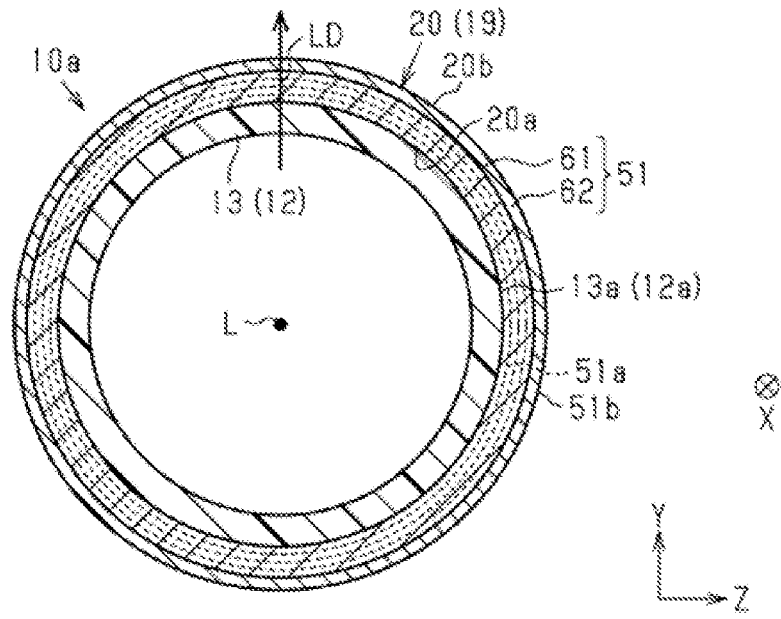
FIG. 4 is a sectional view of the pressure container, taken along line IV-IV in FIG. 2.

As illustrated in FIG. 4, the fiber layers 51 are laminated on the body outer surface 13a in the laminating direction LD. The laminating direction LD is perpendicular to the liner outer surface 12a. In the present embodiment, the plurality of fiber layers 51 includes a plurality of first fiber layers 61 and a second fiber layer 62. In the present embodiment, the multiple first fiber layers 61 are laminated on the body outer surface 13a in the laminating direction LD.

One of the fiber layers 51 that forms an inner surface 20a of the cylindrical body 20 serves as an innermost layer 51a. One of the fiber layers 51 that forms an outer surface 20b of the cylindrical body 20 serves as an outermost layer 51b. The innermost layer 51a is the fiber layer 51 that is closest to the body 13 in the laminating direction LD. The outermost layer 51b is the fiber layer 51 that is most distant from the body 13 in the laminating direction LD. In the present embodiment, the outermost layer 51b is formed of the second fiber layer 62. In the present embodiment, the plurality of fiber layers 51 excluding the outermost layer 51b is formed of the first fiber layers 61. That is, in the present embodiment, the innermost layer 51a is formed of the first fiber layer 61.

The first fiber layer 61 and the second fiber layer 62 may be connected to each other by an interlayer connecting yarn (not illustrated) in the laminating direction LD. Furthermore, the first fiber layers 61 may be connected to each other by an interlayer connecting yarn (not illustrated). In this configuration, the two first fiber layers 61 laminated in the laminating direction LD are connected by the interlayer connecting yarn, for example. Accordingly, the fiber layers 51 may include a plurality of sets of the first fiber layers 61 connected to each other by the interlayer connecting yarn.

[Configuration of First Fiber Layer]

Figure 5:
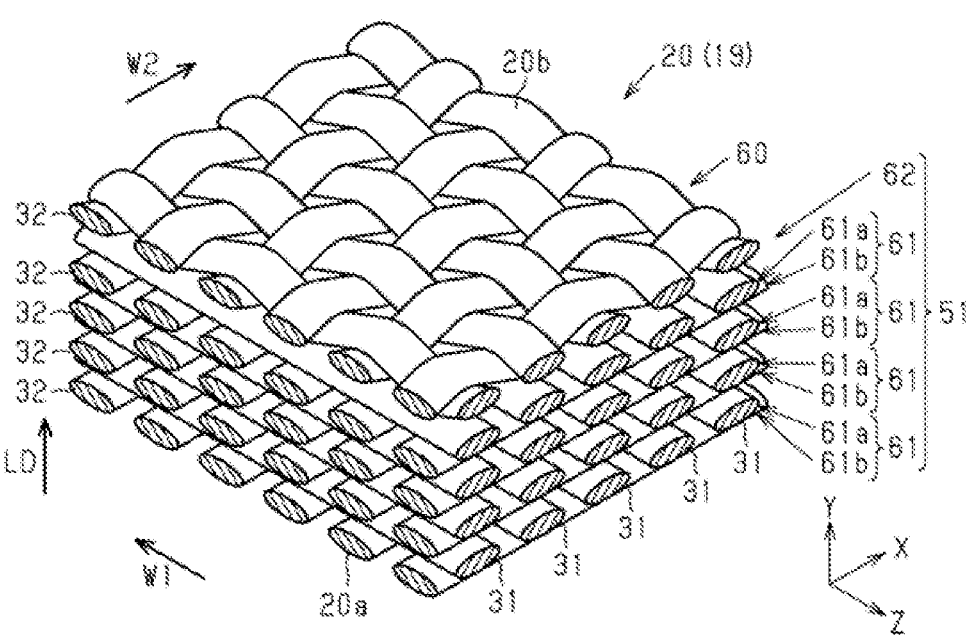
FIG. 5 is a partially enlarged perspective view of the fiber structure according to the first embodiment.
Figure 6:
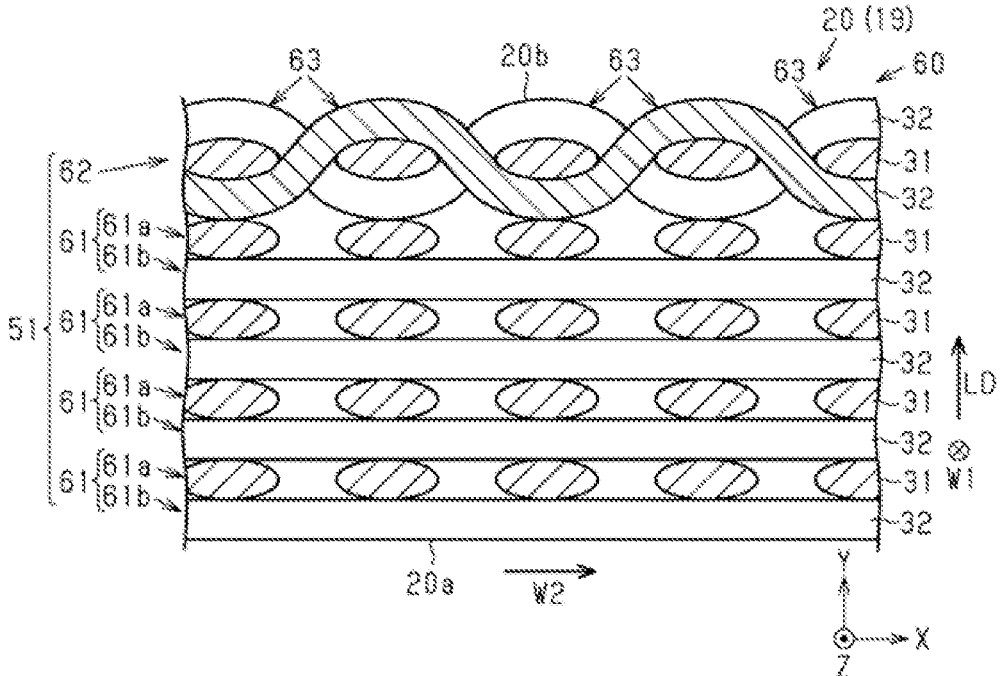
FIG. 6 is a sectional view of the fiber structure according to the first embodiment.

As illustrated in FIGS. 5 and 6, in the present embodiment, each of the first fiber layers 61 includes a plurality of first yarns 31 and a plurality of second yarns 32. The first yarns 31 and the second yarns 32 are formed of reinforced fibers. Examples of the reinforced fibers include carbon fibers and glass fibers. The first fiber layer 61 includes the plurality of first yarns 31 and the plurality of second yarns 32. The first yarns 31 and the second yarns 32 have a flattened cross section. Each of the first yarns 31 and each of the second yarns 32 have approximately the same fineness. The first yarn 31 and the second yarn 32 have the same diameter when viewed in cross section.

As illustrated in FIG. 3, the yarn main axis direction of the first yarn 31 is referred to as a first yarn main axis direction W1. The first yarn main axis direction W1 corresponds to the circumferential direction around the central axis L. The yarn main axis direction of the second yarn 32 on the body outer surface 13a is referred to as a second yarn main axis direction W2. The second yarn main axis direction W2 corresponds to the axial direction X. That is, the second yarn 32 extends in the yarn main axis direction different from the yarn main axis direction of the first yarn 31.

Figure 7:
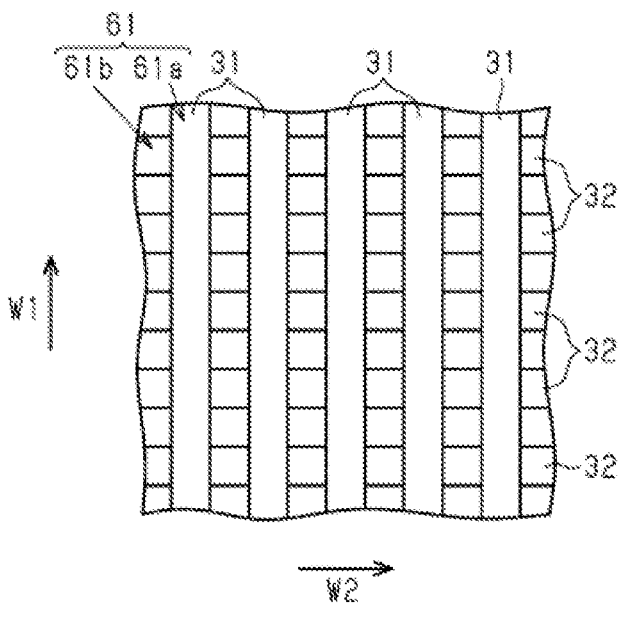
FIG. 7 is a plan view of a first fiber layer according to the first embodiment.
Figure 7:

As illustrated in FIGS. 6 and 7, each of the first fiber layers 61 includes a first yarn layer 61a and a second yarn layer 61b. The first yarn layer 61a includes the first yarns 31 arranged in the axial direction X. The first yarns 31 of the first yarn layer 61a are parallel to each other. The second yarn layer 61b includes the second yarns 32 arranged in the circumferential direction of the liner 12. The second yarns 32 of the second yarn layer 61b are parallel to each other. The first yarn layer 61a and the second yarn layer 61b are unidirectional (UD) sheet that is formed of single directional yarns.

The first yarn layer 61a of the first fiber layer 61 is laminated on the second yarn layer 61b in the laminating direction LD. When the first fiber layer 61 is viewed from the laminating direction LD, the first yarns 31 of the first yarn layer 61a are perpendicular to the second yarns 32 of the second yarn layer 61b. The first fiber layers 61 are laminated on top of each other in the laminating direction LD, so that the first yarn layers 61a and the second yarn layers 61b are alternately laminated in the laminating direction LD.

The first yarns 31 of each first yarn layer 61a serve as the first yarns 31 of the first fiber layer 61. The second yarns 32 of each second yarn layer 61b serve as the second yarns 32 of the first fiber layer 61. In the present embodiment, the first fiber layer 61 has a structure, i.e., a non-crimp structure, in which the second yarns 32 are not interlaced with the first yarns 31. The first fiber layer 61 does not include interlaced sections 63 in which the second yarns 32 are interlaced with the first yarns 31.

[Configuration of Second Fiber Layer]

As illustrated in FIGS. 5 and 6, the second fiber layer 62 includes the first yarns 31 and the second yarns 32. The second fiber layer 62 is a fabric 60 in which the second yarns 32 are interlaced with the first yarns 31. In the present embodiment, the second fiber layer 62 is a single layer fabric made by plain weaving.

Figure 8:
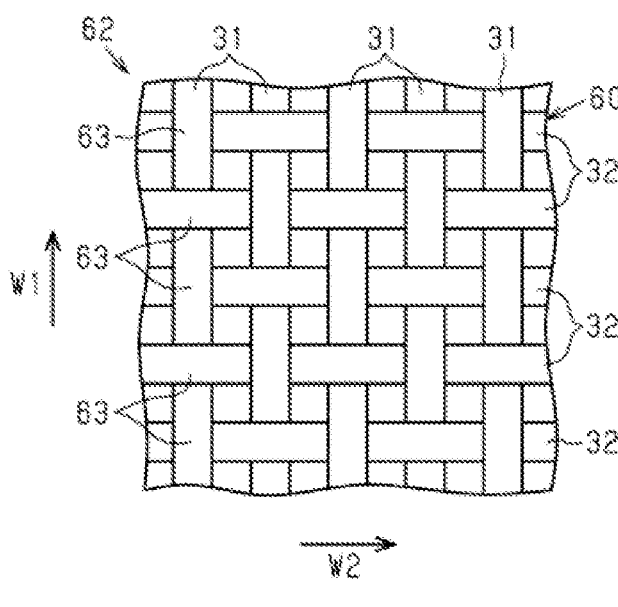
FIG. 8 is a plan view of a second fiber layer according to the first embodiment.
Figure 8:

As illustrated in FIGS. 6 and 8, the second fiber layer 62 includes the first yarns 31 arranged in the axial direction X and the second yarns 32 arranged in the circumferential direction of the liner 12. The first yarns 31 of the second fiber layer 62 are parallel to each other. The second yarns 32 of the second fiber layer 62 are parallel to each other. When the second fiber layer 62 is viewed from the laminating direction LD, the first yarns 31 are perpendicular to the second yarns 32 in the second fiber layer 62.

The first yarns 31 continuously extend between the first fiber layer 61 and the second fiber layer 62. In the present embodiment, the first yarns 31 continuously extend between all the fiber layers 51 laminated in the laminating direction LD.

The second fiber layer 62 includes the interlaced sections 63 in which the second yarns 32 are interlaced with the first yarns 31. In the present embodiment, because the second fiber layer 62 is made by plain weaving, the second fiber layer 62 includes the same number of the interlaced sections 63 as the number of intersections of the second yarns 32 and the first yarns 31. Since the first fiber layer 61 does not include the interlaced sections 63, in the present embodiment, the number of the interlaced sections 63 of the second fiber layer 62 is more than that of the first fiber layer 61.

[Configuration of Dome Fiber Layer]

As illustrated in FIG. 3, the dome fiber layers 52 are laminated on each of the dome outer surfaces 14*a* in the laminating direction LD. In the present embodiment, each of the dome fiber layers 52 is the fabric 60 that includes the first yarns 31 and the second yarns 32. In the present embodiment, the dome fiber layer 52 is a single layer fabric made by plain weaving. The first yarns 31 and the second yarns 32 on the dome outer surface 14*a* extend in their yarn main axis directions on the body outer surface 13*a* and are curved along the dome outer surface 14*a*.

The dome fiber layers 52 may be connected by an interlayer connecting yarn (not illustrated) in the laminating direction LD. Furthermore, the dome fiber layers 52 may be connected to each other by the interlayer connecting yarn (not illustrated). In this configuration, for example, the two adjacent dome fiber layers 52 laminated in the laminating direction LD are connected by the interlayer connecting yarn. Accordingly, the dome fiber layers 52 may include a plurality of sets of the dome fiber layers 52 that are connected to each other by the interlayer connecting yarn.

In the present embodiment, the first yarns 31 continuously extend between all the dome fiber layers 52 laminated in the laminating direction LD. The second yarns 32 continuously extend between the fiber layers 51 and the dome fiber layers 52, so that the dome fiber layers 52 are integrated with the fiber layers 51.

[Method for Manufacturing Fiber Structure]

Figure 9:
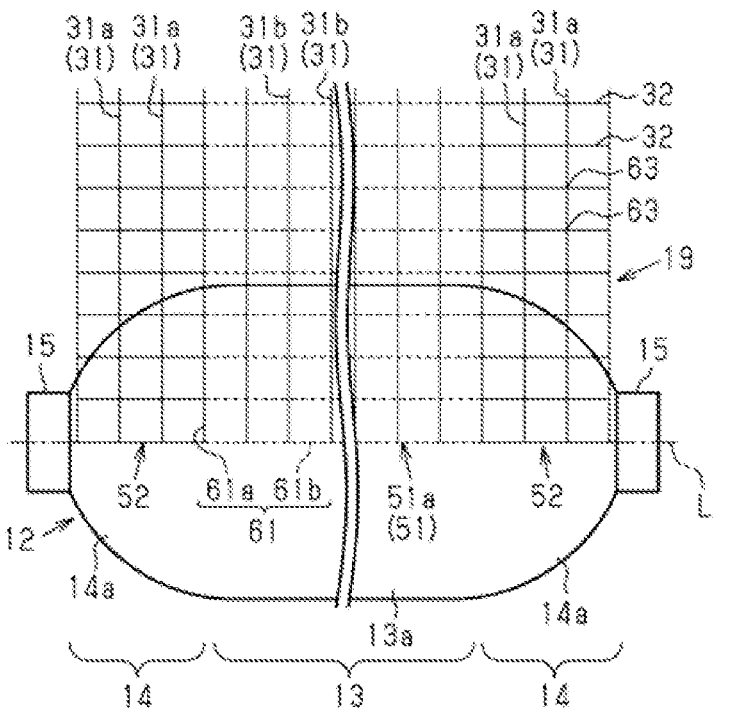
FIG. 9 is a schematic view of the fiber structure according to the first embodiment, explaining a method for manufacturing the fiber structure.
Figure 10:
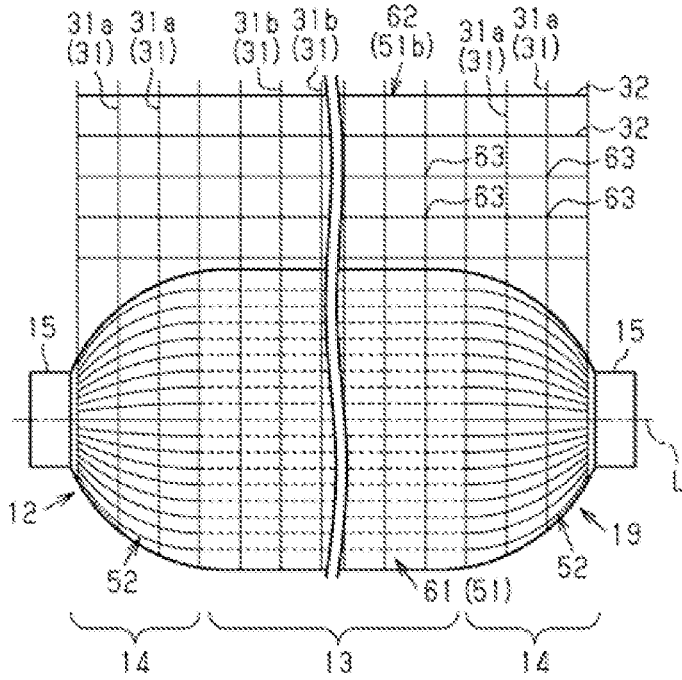
FIG. 10 is a schematic view of the fiber structure according to the first embodiment, explaining the method for manufacturing the fiber structure.
Figure 10:

The following will describe a method for manufacturing the fiber structure 19 with reference to FIGS. 9 and 10.

As illustrated in FIG. 9, the fiber structure 19 is manufactured such that the liner 12 is rotated about the central axis L. Accordingly, the fiber structure 19 wound around the liner 12 is manufactured. The first yarns 31 serve as warp. The second yarns 32 serves as weft. The first yarns 31 are supplied from a warp beam toward the liner 12. The first yarns 31 are moved up and down by a heddle to form a passage between the first yarns 31.

The first yarns 31 drawn from the warp beam are fixed, at the ends of the first yarns 31, to the body outer surface 13*a* or the dome outer surface 14*a*. The first yarns 31, the ends of which are fixed to the dome outer surface 14*a*, serve as dome warp yarns 31*a*. The first yarns 31, the ends of which are fixed to the body outer surface 13*a*, serve as body warp yarns 31*b*.

To form each dome fiber layer 52, firstly, the second yarns 32 are inserted into a passage formed between the dome warp yarns 31*a*. The second yarns 32 are interlaced with the dome warp yarns 31*a*. The actions of forming the passage between the dome warp yarns 31*a* and inserting the second yarns 32 into the passage between the dome warp yarns 31*a* are repeatedly performed with repetition of beating by a reed. In this way, the dome fiber layer 52 is woven on the dome outer surface 14*a*. The dome fiber layer 52 is made by plain weaving with the first yarns 31 and the second yarns 32.

The second yarns 32 are repeatedly inserted into the passage between the dome warp yarns 31*a* while the liner 12 is rotated. Accordingly, the multiple dome fiber layers 52 are laminated on the dome outer surface 14*a* in the laminating direction LD. In this way, the dome fiber layers 52 are formed.

The dome warp yarns 31*a* are wound around the liner 12 with the rotation of the liner 12. The dome warp yarns 31*a* are used for forming the dome fiber layers 52, so that the first yarns 31 continuously extend between all the dome fiber layers 52.

As well as the dome warp yarns 31*a*, the body warp yarns 31*b* are wound around the liner 12. The body warp yarns 31*b* are used for forming each fiber layer 51. Accordingly, in the present embodiment, the first yarns 31 continuously extend between the first fiber layers 61 and the second fiber layer 62.

The fiber layer 51 is formed while the dome fiber layer 52 is formed. To form the fiber layer 51, in the present embodiment, the second yarns 32 inserted into the passage between the dome warp yarns 31*a* are inserted into a space between the body warp yarns 31*b* and the body outer surface 13*a*. The second yarns 32 are inserted through the passage between the dome warp yarns 31*a* of the dome fiber layer 52 on the one dome outer surface 14*a* into the space between the body warp yarns 31*b* and the body outer surface 13*a*, and subsequently inserted into the passage between the dome warp yarns 31*a* of the dome fiber layer 52 on the other dome outer surface 14*a*. The second yarns 32 are not interlaced with the body warp yarns 31*b*.

The second yarns 32 are repeatedly inserted into the space between the body warp yarns 31*b* and the body outer surface 13*a*. Accordingly, the second yarn layer 61*b* is formed on the body outer surface 13*a*. The first yarn layer 61*a* is laminated on the second yarn layer 61*b* in the laminating direction LD. In this way, the first fiber layer 61 as the innermost layer 51*a* is formed.

After the innermost layer 51*a* is formed, the second yarns 32 are repeatedly inserted into a space between the body warp yarns 31*b* and the first fiber layer 61 previously formed. As when the innermost layer 51*a* is formed, the second yarns 32, which have been inserted through the passage between the dome warp yarns 31*a*, are inserted into the space between the body warp yarns 31*b* and the first fiber layer 61. The first yarn layer 61*a* is laminated on the second yarn layer 61*b* in the laminating direction LD so that the first yarn layers 61*a* and the second yarn layers 61*b* are alternately laminated on top of each other. The multiple first fiber layers 61 are laminated on the body outer surface 13*a* in the laminating direction LD. In this way, the fiber layers 51 excluding the outermost layer 51*b* are formed as the first fiber layers 61.

In FIGS. 9 and 10, the second yarns 32 of each of the fiber layers 51 excluding the outermost layer 51*b* are illustrated by broken lines. The second yarns 32 of the dome fiber layers 52 and the outermost layer 51*b* are illustrated by solid lines.

As illustrated in FIG. 10, to form the outermost layer 51*b*, the second yarns 32 are inserted into the passage formed between the body warp yarns 31*b*. As when the fiber layers 51 excluding the outermost layer 51*b* are formed, the second yarns 32, which have been inserted through the passage between the dome warp yarns 31*a*, are inserted into the passage between the body warp yarns 31*b*. The second yarns 32 of the outermost layer 51*b* are interlaced with the body warp yarns 31*b*. The actions of forming the passage between the body warp yarns 31*b* and inserting the second yarns 32 into the passage between the body warp yarns 31*b* are repeatedly performed with repetition of beating by a reed. In this way, the second fiber layer 62 is woven as the outermost layer 51*b*. The second fiber layer 62 is made by plain weaving with the first yarns 31 and the second yarns 32. In this way, the fiber layers 51 are formed. The fiber structure 19 is manufactured by forming the fiber layers 51 and the dome fiber layers 52.

[Impregnation of Fiber Structure with Resin]

Figure 11:
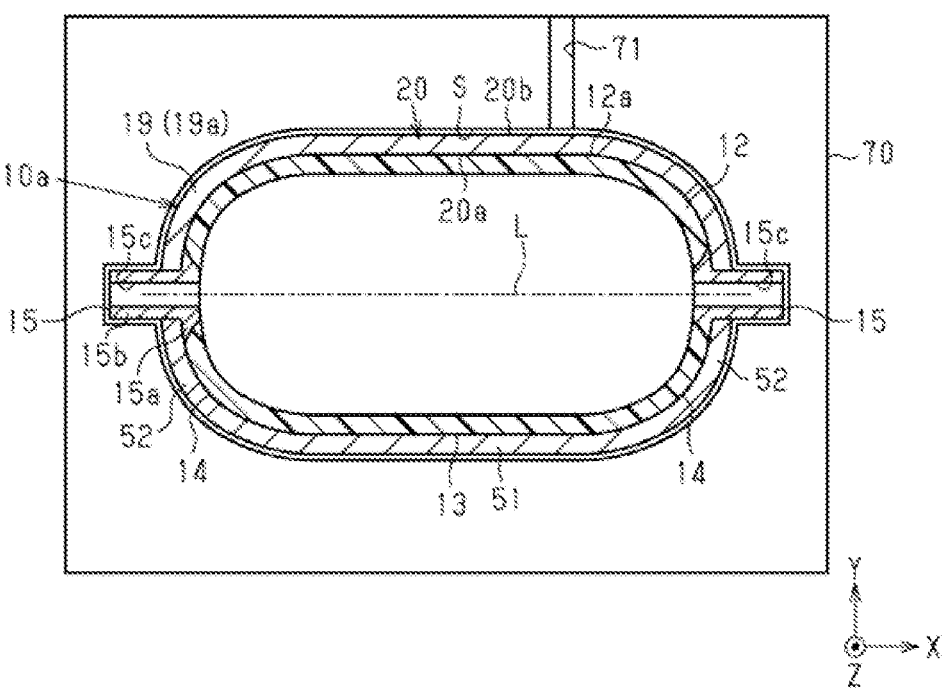
FIG. 11 is a schematic view of the fiber structure according to the first embodiment, explaining impregnation of the fiber structure with resin.

The following will describe a method for impregnating the fiber structure 19 with resin with reference to FIG. 11.

As illustrated in FIG. 11, the pressure container precursor 10*a* including the fiber structure 19 is placed in a forming mold 70 after the fiber structure 19 is formed on the liner outer surface 12*a*. The fiber structure 19 is impregnated with the resin matrix Ma by RTM. In this way, the pressure container 10 having the liner outer surface 12*a* covered with the fiber-reinforced composite material 11 is formed.

Although not illustrated, the forming mold 70 is formed of a plurality of members. The plurality of members assembled define an enclosed space S in the forming mold 70. The pressure container precursor 10*a* is placed in the enclosed space S.

The forming mold 70 has a resin flow passage 71. The resin matrix Ma is injected to the enclosed space S through the resin flow passage 71. The resin matrix Ma fills a gap between the forming mold 70 and the pressure container precursor 10*a*. Accordingly, the dome fiber layers 52 are impregnated with the resin matrix Ma. The fiber layers 51 are impregnated with the resin matrix Ma sequentially from the outermost layer 51*b* to the innermost layer 51*a*.

After the fiber structure 19 is impregnated with the resin matrix Ma, the fiber structure 19 is heated by the forming mold 70 to a temperature sufficient to thermally cure the resin matrix Ma. The temperature is set to a curing temperature of epoxy resin, which is used as the resin matrix Ma. The resin matrix Ma in the fiber structure 19 is cured with heat by the forming mold 70.

The whole of the resin matrix Ma in the fiber structure 19 is thermally cured, so that the fiber-reinforced composite material 11 is formed. In this way, the pressure container 10 including the fiber-reinforced composite material 11 is manufactured. The pressure container 10 is cooled and removed from the forming mold 70.

[Operation]

The following will describe the operation according to the present embodiment.

In the present embodiment, the second yarns 32 are interlaced with the first yarns 31 in the interlaced sections 63, and the number of the interlaced sections 63 of the second fiber layer 62 is more than that of the first fiber layer 61. The first fiber layers 61 form the fiber layers 51 excluding the outermost layer 51*b*. The second fiber layer 62 forms the outermost layer 51*b*.

The resin matrix Ma fills the gap between the forming mold 70 and the pressure container precursor 10*a*. The fiber layer 51 as the outermost layer 51*b* is subjected to impregnation resistance of the resin matrix Ma. In the present embodiment, the outermost layer 51*b* subjected to the impregnation resistance of the resin matrix Ma, and the number of the interlaced sections 63 of the outermost layer 51*b* is more than the number of the interlaced sections 63 of each of the fiber layers 51 excluding the outermost layer 51*b*. Accordingly, the reinforced fibers of the outermost layer 51*b* are unlikely to become wavy, which may be caused by the impregnation resistance of the resin matrix Ma.

In the present embodiment, each of the first fiber layers 61 has a structure, i.e., a non-crimp structure, in which the second yarns 32 are not interlaced with the first yarns 31. In other words, the number of the interlaced sections 63 of the first fiber layer 61 is less than that of the second fiber layer

62. When the fiber structure 19 is impregnated with the resin matrix Ma, the impregnation resistance of the resin matrix Ma is reduced by the outermost layer 51*b*. Then the fiber layers 51 excluding the outermost layer 51*b* are subjected to the impregnation resistance of the resin matrix Ma. Accordingly, the reinforced fibers of the fiber layers 51 excluding the outermost layer 51*b* are unlikely to become wavy, which may be caused by the impregnation resistance of the resin matrix Ma.

The second yarns 32 in the first fiber layers 61 do not become wavy, which may be caused by the interlacement of the second yarns 32 with the first yarns 31. This increases the strength of the fiber-reinforced composite material 11 without increasing the number or thickness of the first yarns 31 and the second yarns 32 of the fiber structure 19. According to the present embodiment, the first fiber layers 61 form the fiber layers 51 excluding the outermost layer 51*b*, and this configuration suppresses an increase in weight of the fiber-reinforced composite material 11.

[Advantageous Effects]

The first embodiment achieves the following advantageous effects.

(1) According to the embodiment, the outermost layer 51*b* is formed of the second fiber layer 62. The second yarns 32 are interlaced with the first yarns 31 in the interlaced sections 63, and the number of the interlaced sections 63 of the second fiber layer 62 is more than that of the first fiber layer 61. Accordingly, the reinforced fibers of the second fiber layer 62 are unlikely to become wavy, which may be caused by the impregnation resistance of thermosetting resin. This suppresses a decrease in the pressure capacity and the fatigue strength of the fiber-reinforced composite material 11 formed of the fiber structure 19. According to the embodiment, the number of the interlaced sections 63 of the first fiber layer 61 is less than that of the second fiber layer 62. Accordingly, the second yarns 32 of the first fiber layers 61 are less likely to become wavy, which may be caused by interlacement of the second yarns 32 with the first yarns 31, as compared with the second yarns 32 of the second fiber layer 62. The multiple fiber layers 51 include the first fiber layers 61, thereby increasing the strength of the fiber-reinforced composite material 11 formed of the fiber structure 19. This increases the strength of the fiber-reinforced composite material 11 without increasing the number or thickness of the first yarns 31 and the second yarns 32 of the fiber structure 19, thereby suppressing an increase in weight of the fiber-reinforced composite material 11. This therefore suppresses a decrease in the pressure capacity and the fatigue strength and an increase in weight of a fiber-reinforced composite material 11 formed of a fiber structure 19, and increases the strength of the fiber-reinforced composite material 11.

(2) The first yarns 31 continuously extend between the first fiber layers 61 and the second fiber layer 62. This increases the strength of the fiber structure 19 in the yarn main axis direction of the first yarns 31, as compared with a configuration in which the first yarns 31 do not continuously extend between the first fiber layers 61 and the second fiber layer 62. This further increases the strength of the fiber-reinforced composite material 11 formed of the fiber structure 19.

Second Embodiment

Figure 12:
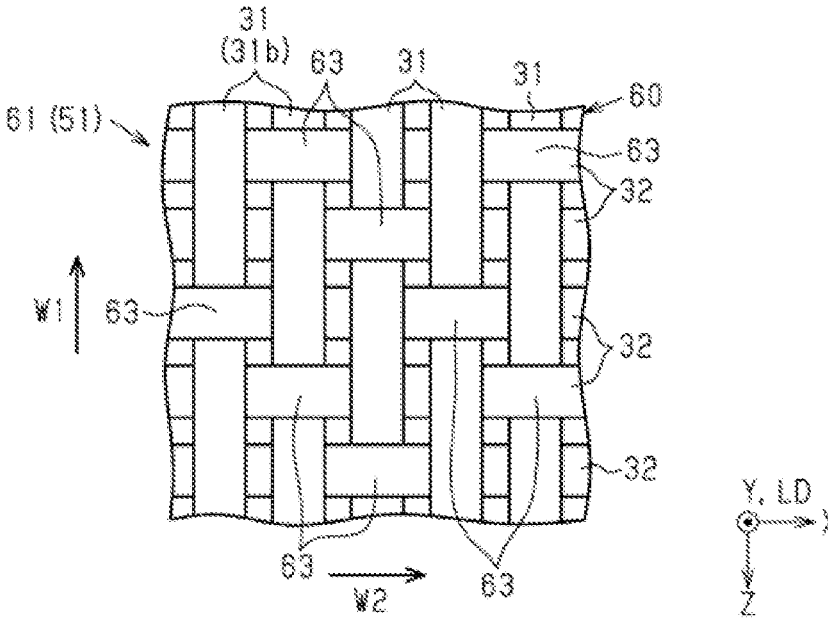
FIG. 12 is a plan view of a first fiber layer according to a second embodiment.

The following will describe a fiber structure 19 according to a second embodiment with reference to accompanying FIGS. 4, 8, and 12. The second embodiment is different from the first embodiment in that each of the first fiber layers 61 does not include the first yarn layers 61*a* and the second yarn layers 61*b*. The following description will focus on such a difference. The same elements as in the first embodiment are denoted by the same reference numbers and are not elaborated here.

[Configuration of Fiber Structure]

As illustrated in FIGS. 4 and 12, in the present embodiment, each of the first fiber layers 61 does not include the first yarn layer 61*a* and the second yarn layer 61*b* of the first embodiment. The first fiber layer 61 is the fabric 60 in which the second yarns 32 are interlaced with the first yarns 31. That is, the first fiber layer 61 and the second fiber layer 62 are each formed of the fabric 60. In the present embodiment, the first fiber layer 61 and the second fiber layer 62 include the interlaced sections 63 in which the second yarns 32 are interlaced with the first yarns 31. In the present embodiment, the first fiber layer 61 is made by twill weaving. For example, in the first fiber layer 61, the second yarns 32 are interlaced with the first yarns 31 by passing over one first yarn 31 then under two first yarns 31.

The first fiber layer 61 includes the first yarns 31 and the second yarns 32. The first yarn main axis direction W1 of the first yarns 31 of the first fiber layer 61 corresponds to the circumferential direction around the central axis L. The second yarn main axis direction W2 of the second yarns 32 of the first fiber layer 61 corresponds to the axial direction X. That is, the second yarn 32 extends in the yarn main axis direction different from the yarn main axis direction of the first yarn 31. The first yarns 31 of the first fiber layer 61 are arranged parallel to each other in the axial direction X. The second yarns 32 of the first fiber layer 61 are arranged parallel to each other in the circumferential direction of the liner 12. When the first fiber layer 61 is viewed from the laminating direction LD, the first yarns 31 are perpendicular to the second yarns 32 in the first fiber layer 61. The first yarns 31 continuously extend between the first fiber layers 61 and the second fiber layer 62.

In the present embodiment, each of the dome fiber layers 52 is the fabric 60 that includes the first yarns 31 and the second yarns 32, like the first embodiment. In the present embodiment, the dome fiber layer 52 is a single layer fabric made by plain weaving. The first yarns 31 continuously extend between all the dome fiber layers 52 laminated in the laminating direction LD. The second yarns 32 continuously extend between the fiber layers 51 and the dome fiber layer 52.

[Comparison of Interlaced Section Between First Fiber Layer and Second Fiber Layer]

As illustrated in FIGS. 8 and 12, in the present embodiment, the second fiber layer 62 is a single layer fabric made by plain weaving, like the first embodiment. Accordingly, in the present embodiment, the second fiber layer 62 includes the same number of the interlaced sections 63 as the number of intersections of the second yarns 32 and the first yarns 31. In the present embodiment, the number of the interlaced sections 63 of the second fiber layer 62 is more than that of the first fiber layer 61.

[Method for Manufacturing Fiber Structure]

As illustrated in FIGS. 4 and 12, in the present embodiment, the second yarns 32 are repeatedly inserted into the passage formed between the body warp yarns 31*b* to form each of the first fiber layers 61. In this way, the first fiber layer 61 as the innermost layer 51*a* is woven. The multiple first fiber layers 61 are laminated on the body outer surface 13*a* in the laminating direction LD. In this way, the fiber layers 51 excluding the outermost layer 51*b* are formed as the first fiber layers 61. The second fiber layer 62 and the dome fiber layers 52 are formed in the same manner as those of the first embodiment. The fiber structure 19 is manufactured by forming the fiber layers 51 and the dome fiber layers 52. The fiber structure 19 is impregnated with the resin matrix Ma by RTM like the first embodiment, so that the pressure container 10 having the liner outer surface 12*a* covered with the fiber-reinforced composite material 11 is formed.

[Operation]

The following will describe the operation according to the present embodiment.

In the present embodiment, the second yarns 32 are interlaced with the first yarns 31 in the interlaced sections 63, and the number of the interlaced sections 63 of the second fiber layer 62 is more than that of each first fiber layer 61. The first fiber layers 61 form the fiber layers 51 excluding the outermost layer 51*b*. The second fiber layer 62 forms the outermost layer 51*b*. Accordingly, the reinforced fibers of the fiber layers 51 are unlikely to become wavy, which may be caused by the impregnation resistance of the resin matrix Ma, like the first embodiment.

The second yarns 32 of the first fiber layers 61 are less likely to become wavy, which may be caused by interlacement of the second yarns 32 with the first yarns 31, as compared with the second yarns 32 of the second fiber layer 62.

The first fiber layers 61 form the fiber layers 51 excluding the outermost layer 51*b*, and this configuration suppresses an increase in weight of the fiber-reinforced composite material 11 and increases the strength of the fiber-reinforced composite material 11.

[Advantageous Effects]

The second embodiment achieves the same advantageous effects as those of the first embodiment.

The fiber structure 19 according to the embodiments may be modified as described below. The embodiments may be combined with the following modifications within technically consistent range.

Figure 13:
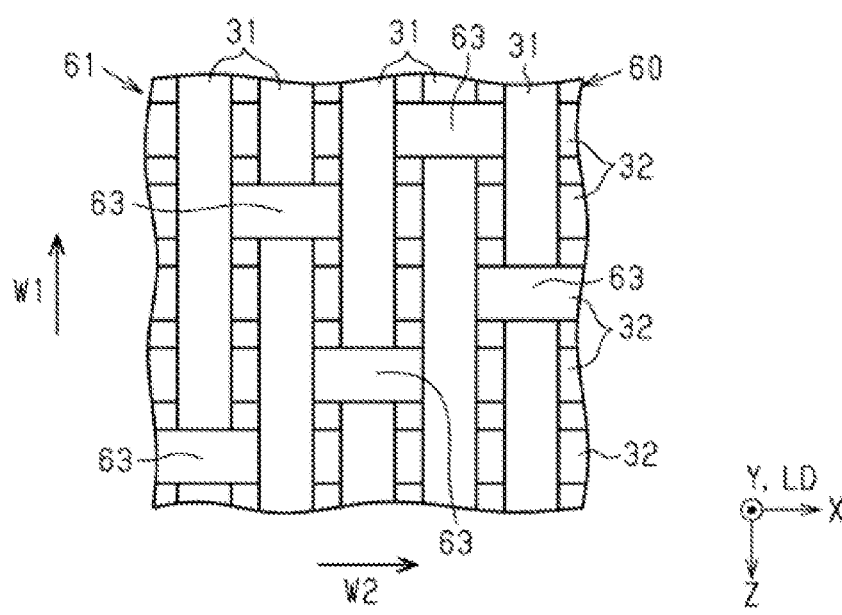
FIG. 13 is a plan view of a first fiber layer according to another embodiment.

As illustrated in FIG. 13, each of the first fiber layers 61 according to the second embodiment may be made by satin weaving. For example, in the first fiber layer 61 of this modification example, the second yarns 32 are interlaced with the first yarns 31 by passing over one first yarns 31 then under four first yarn 31. In this modification example, the first fiber layer 61 is the fabric 60 in which the second yarns 32 are interlaced with the first yarns 31. That is, the first fiber layer 61 and the second fiber layer 62 are each formed of the fabric 60. In the present embodiment, the first fiber layer 61 and the second fiber layer 62 include the interlaced sections 63 in which the second yarns 32 are interlaced with the first yarns 31. The second fiber layer 62 is a single layer fabric made by plain weaving, like the aforementioned embodiments. Accordingly, the second fiber layer 62 includes the same number of the interlaced sections 63 as the number of intersections of the second yarns 32 and the first yarns 31. In this modification example, the number of the interlaced sections 63 of the second fiber layer 62 is more than that of the first fiber layer 61. Accordingly, this modification example achieves the same advantageous effects as those of the embodiments.

The second fiber layer 62 is made by plain weaving in the second embodiment, but the second fiber layer 62 is not limited thereto. For example, the second fiber layer 62 may be made by twill weaving. In this case, for example, the first fiber layer 61 is made by satin weaving. The number of the interlaced sections 63 of the second fiber layer 62 is more than that of the first fiber layer 61.

In the first embodiment, the first fiber layer 61 has to include at least one of the first yarn 31 and the second yarn 32. For example, the first yarn layer 61a or the second yarn layer 61b may be removed from the first fiber layer 61. In this configuration, the first fiber layer 61 includes either the first yarns 31 or the second yarns 32.

The first yarns 31 may not continuously extend between the first fiber layers 61 and the second fiber layer 62.

In the second embodiment, the first fiber layers 61 may be partly different. For example, the first fiber layers 61 may be partly different in weave or yarns. If the first fiber layers 61 may be partly different in weave, for example, a part of the first fiber layers 61 may be made by twill weaving and the rest of the first fiber layers 61 may be made by satin weaving. In this configuration, the number of the interlaced sections 63 of the second fiber layer 62, which is made by plain weaving, is more than that of each first fiber layer 61. If the first fiber layers 61 may be partly different in yarns, for example, a part of the first fiber layers 61 may include the first yarns 31 and the second yarns 32 and the rest of the first fiber layers 61 may include either the first yarns 31 or the second yarns 32.

Figure 14:
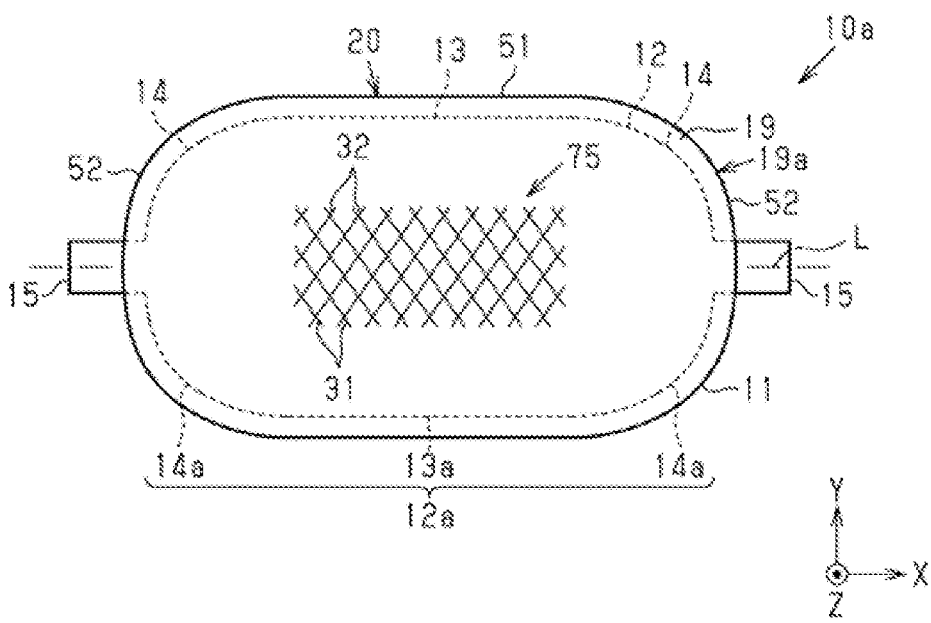
FIG. 14 is a schematic side view of a pressure container precursor using a fiber structure according to another embodiment.
Figure 15:
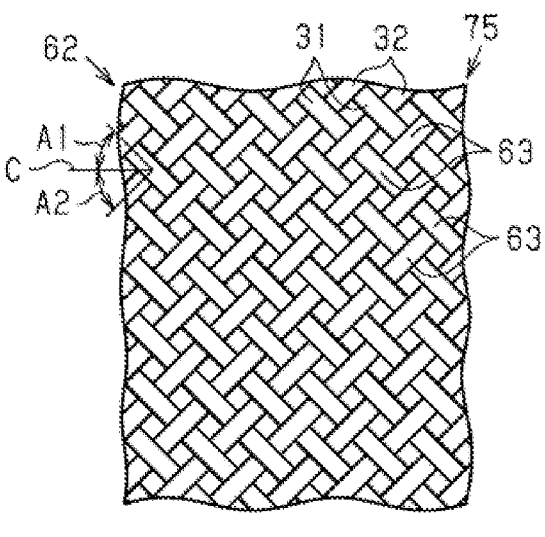
FIG. 15 is a plan view of a second fiber layer according to another embodiment.

As illustrated in FIGS. 14 and 15, in the first embodiment and the second embodiment, the second fiber layer 62 may be a braid 75. That is, the second fiber layer 62 is not limited to the fabric 60. Specifically, the second fiber layer 62 according to the modification example includes the plurality of first yarns 31 and the plurality of second yarns 32. The first yarns 31 and the second yarns 32 cross each other. For example, the first yarns 31 and a center line C, which is parallel to the central axis L, cross each other at a first angle A1. For example, the second yarns 32 and the center line C cross each other at a second angle A2. For example, the first angle A1 is 60°. For example, the second angle A2 is −60°. In this modification example, the second fiber layer 62 includes the same number of the interlaced sections 63 as the number of intersections of the second yarns 32 and the first yarns 31. In this modification example, the number of the interlaced sections 63 of the second fiber layer 62 is more than that of the first fiber layer 61. Accordingly, this modification example achieves the same advantageous effects as those of the embodiments.

In the first embodiment and the second embodiment, the plurality of dome fiber layers 52 is not limited to plain weave fabric. For example, the dome fiber layers 52 may be formed of fabrics 60 made by weaving other than plain weaving. For example, the dome fiber layers 52 may be made by twill weaving or satin weaving. For example, the dome fiber layers 52 may include dome fiber layers 52 that are formed of the fabrics 60, and dome fiber layers 52 that are formed of braids 75 and externally cover the dome fiber layers 52 formed of the fabrics 60.

In the first embodiment and the second embodiment, the innermost layer 51a may be formed of the second fiber layer 62. In this configuration, for example, the fiber layers 51 excluding the innermost layer 51a may be formed of the first fiber layers 61. Examples of the method for impregnating the fiber structure 19 with the resin matrix Ma by RTM include filling the resin matrix Ma into a gap between the liner outer surface 12a and the fiber structure 19. In this method, the caps 15 of the liner 12 have a resin passage between the liner outer surface 12a and the fiber structure 19. The resin matrix Ma is filled into the fiber structure 19 through the resin passage. The fiber layer 51 as the innermost layer 51a is subjected to impregnation resistance of the resin matrix Ma. In this modification example, the second fiber layer 62 is formed of the innermost layer 51a that is subjected to the impregnation resistance of the resin matrix Ma. The number of the interlaced sections 63 of the second fiber layer 62 is more than that of the first fiber layer 61. Accordingly, the reinforced fibers of the innermost layer 51a are unlikely to become wavy, which may be caused by the impregnation resistance of the resin matrix Ma. Both of the innermost layer 51a and the outermost layer 51b may be formed of the second fiber layer 62. In this configuration, for example, the fiber layers 51 excluding the innermost layer 51a and the outermost layer 51b may be formed of the first fiber layers 61.

The liner 12 may be made of a metallic material.

The liner 12 may be integrally formed with the caps 15.

The pressure container 10 is not limited to a container that is mounted to a fuel-cell electric vehicle as a hydrogen source, and may be used as a hydrogen source of a hydrogen engine or applicable to a heat pump and the like. The pressure container 10 may be used as a hydrogen source for a fuel cell for household use.

The pressure container 10 is not limited to a container for storing hydrogen gas. The pressure container 10 may store gas, such as compressed natural gas (CNG) or liquid natural gas (LNG).

The shape of the fiber structure 19 may be modified except for the shape of the cylindrical body 20. That is, the fiber structure 19 has to include the cylindrical body 20. For example, the fiber structure 19 may not include at least one of the dome fiber layers 52 on one side of the cylindrical body 20 and the dome fiber layers 52 on the other side of the cylindrical body 20 in the axial direction X. For example, in the fiber structure 19, at least one of opposite sides of the cylindrical body 20 in the axial direction X may include fiber layers that are different from the dome fiber layers 52.

The fiber structure 19 may be a fiber preform 19a used for a purpose other than the pressure container 10.

REFERENCE SIGNS LIST

LD Laminating direction
W1 First yarn main axis direction
W2 Second yarn main axis direction
11 Fiber-reinforced composite material
19 Fiber structure
20 Cylindrical body
20a Inner surface
20b Outer surface
31 First yarn
32 Second yarn
51 Fiber layer
51a Innermost layer
51b Outermost layer
60 Fabric
61 First fiber layer
62 Second fiber layer
63 Interlaced section

The invention claimed is:

1. A fiber structure impregnated with thermosetting resin by RTM (Resin Transfer Molding) to form a fiber-reinforced composite material, the fiber structure comprising:

a cylindrical body having a cylindrical shape, wherein the cylindrical body has a plurality of fiber layers laminated on top of each other in a laminating direction, the plurality of fiber layers includes:

a first fiber layer including at least one of a first yarn and a second yarn extending in a yarn main axis direction that is different from a yarn main axis direction of the first yarn; and a second fiber layer including the first yarn and the second yarn, the first yarn and the second yarn are formed of reinforced fibers, the first fiber layer does not include interlaced sections in which the second yarn is interlaced with the first yarn, one of the fiber layers that forms an inner surface of the cylindrical body serves as an innermost layer, and another one of the fiber layers that forms an outer surface of the cylindrical body serves as an outermost layer, at least one of the innermost layer and the outermost layer is formed of the second fiber layer, and the second fiber layer includes the interlaced sections, and the first fiber layer is subjected to impregnation resistance of a resin matrix after the impregnation resistance of the resin matrix is reduced by the second fiber layer.

2. The fiber structure according to claim 1, wherein the first fiber layer includes the first yarn, and the first yarn continuously extends between the first fiber layer and the second fiber layer.

3. A fiber structure impregnated with thermosetting resin by RTM (Resin Transfer Molding) to form a fiber-reinforced composite material, the fiber structure comprising:

a cylindrical body having a cylindrical shape, wherein the cylindrical body has a plurality of fiber layers laminated on top of each other in a laminating direction, the plurality of fiber layers includes:

a first fiber layer including a first yarn and a second yarn extending in a yarn main axis direction that is different from a yarn main axis direction of the first yarn; and a second fiber layer including the first yarn and the second yarn, the first yarn and the second yarn are formed of reinforced fibers, the first fiber layer and the second fiber layer each include interlaced sections in which the second yarn is interlaced with the first yarn, at least one of the first fiber layer and the second fiber layer is formed of a fabric, one of the fiber layers that forms an inner surface of the cylindrical body serves as an innermost layer, and another one of the fiber layers that forms an outer surface of the cylindrical body serves as an outermost layer, and at least one of the innermost layer and the outermost layer is formed of the second fiber layer, and the number of the interlaced sections of the second fiber layer is more than the number of the interlaced sections of the first fiber layer, and the first fiber layer is subjected to impregnation resistance of a resin matrix after the impregnation resistance of the resin matrix is reduced by the second fiber layer.

4. The fiber structure according to claim 3, wherein the first fiber layer includes the first yarn, and the first yarn continuously extends between the first fiber layer and the second fiber layer.

* * * * *